(12) United States Patent
Lopez Otamendi (10) Patent No.: US 9,359,759 B2
(45) Date of Patent: Jun. 7, 2016

(54) ECOLOGICAL CONSTRUCTION SYSTEMS FOR BUILDINGS WITH GREEN WALLS

(71) Applicant: ELEVEN SOLUTIONS RFE S.A. DE C.V., Querétaro (MX)

(72) Inventor: Eduardo Lopez Otamendi, Querétaro (MX)

(73) Assignee: ELEVEN SOLUTIONS RFE S.A. DE C.V., Queretaro (MX)

( * ) Notice: Subject to any disclaimer, the term of this patent is extended or adjusted under 35 U.S.C. 154(b) by 0 days.

(21) Appl. No.: 14/646,945

(22) PCT Filed: Nov. 30, 2012

(86) PCT No.: PCT/MX2012/000122
§ 371 (c)(1),
(2) Date: May 22, 2015

(87) PCT Pub. No.: WO2014/084702
PCT Pub. Date: Jun. 5, 2014

(65) Prior Publication Data
US 2015/0300011 A1    Oct. 22, 2015

(51) Int. Cl.
*E04F 19/00* (2006.01)
*E04H 14/00* (2006.01)
(Continued)

(52) U.S. Cl.
CPC ... *E04B 2/86* (2013.01); *A01G 9/02* (2013.01); *A01G 9/025* (2013.01); *E04B 1/16* (2013.01);
(Continued)

(58) Field of Classification Search
CPC ............. E04B 1/16; E04B 1/167; E04B 2/86; E04B 2103/02; A01G 9/02
See application file for complete search history.

(56) References Cited

U.S. PATENT DOCUMENTS

| | | |
|---|---|---|
| 1,877,898 A | 9/1932 | Kotrbaty |
| 2,101,073 A | 12/1937 | Kotrbaty |

(Continued)

FOREIGN PATENT DOCUMENTS

| | | |
|---|---|---|
| FR | 2746126 A1 | 9/1997 |
| JP | 2008029322 A | 2/2008 |

(Continued)

OTHER PUBLICATIONS

International Search Report for PCT/MX2012/000122 dated Jul. 8, 2013 in English and Spanish language.

(Continued)

*Primary Examiner* — Patrick Maestri
(74) *Attorney, Agent, or Firm* — Smith, Gambrell & Russell, LLP (57) ABSTRACT

The present invention relates to a ecological construction system for buildings with green walls. The system is based on the provision of an integral wall structure, one of the section of which comprises concrete and steel reinforced formwork as the main supporting structure, while the remaining part of the section comprises hollow cavities and arrangements of punched sections on the front or rear surface thereof, with drip-irrigation pipes and nozzles being provided therein. Plastic containers are housed in, and fixed to the punched arrangements distributed on the front or rear wall, which containers form a means for supporting natural or artificial substrates (soil, mineral fibers or wools) and also for the cultivation of plants, a channel being provided in the lower part of the wall structure for collecting, filtering and conveying water to a container for reincorporating said water into the irrigation system. The resulting system allows the growth of plants and vegetation on green walls for construction purposes and can be used on all types of new or existing buildings.

22 Claims, 8 Drawing Sheets

(51) Int. Cl.
*E04B 2/86* (2006.01)
*E04C 1/39* (2006.01)
*A01G 9/02* (2006.01)
*E04B 1/16* (2006.01)

(52) U.S. Cl.
CPC ............... *E04B 1/167* (2013.01); *E04B 2/8629* (2013.01); *E04C 1/397* (2013.01); *E04B 2103/02* (2013.01); *Y02P 60/244* (2015.11)

(56) References Cited

U.S. PATENT DOCUMENTS

| | | | |
|---|---|---|---|
| 5,465,545 A | 11/1995 | Trousilek | |
| 5,473,850 A | 12/1995 | Balding | |
| 5,528,876 A | 6/1996 | Lu | |
| 5,608,999 A | 3/1997 | McNamara | |
| 5,729,944 A | 3/1998 | De Zen | |
| 6,247,280 B1 | 6/2001 | Grinshpun et al. | |
| 6,295,770 B1 | 10/2001 | Sheu et al. | |
| 6,725,601 B2 * | 4/2004 | Chick | A01G 9/025 47/39 |
| 7,628,570 B2 | 12/2009 | Davidsaver et al. | |
| 7,818,919 B1 | 10/2010 | Maxwell-Merrill et al. | |
| 2004/0010994 A1 | 1/2004 | Piccone | |
| 2008/0022619 A1 | 1/2008 | Scherrer | |
| 2010/0251657 A1 | 10/2010 | Richardson et al. | |
| 2013/0140427 A1 | 6/2013 | Martigli et al. | |
| 2014/0318062 A1 | 10/2014 | Richardson et al. | |
| 2014/0318067 A1 | 10/2014 | Richardson et al. | |
| 2015/0275531 A1 | 10/2015 | Alcala Ordaz | |

FOREIGN PATENT DOCUMENTS

| | | |
|---|---|---|
| JP | 2012075397 A | 4/2012 |
| WO | 00/28166 | 5/2000 |
| WO | 2005/098158 | 10/2005 |
| WO | 2010142000 A1 | 12/2010 |
| WO | 2012010792 A1 | 1/2012 |

OTHER PUBLICATIONS

Written Opinion of the International Searching Authority for PCT/MX/2012/000122 dated May 31, 2015. Spanish with English Translation. 11 pages.

* cited by examiner

ECOLOGICAL CONSTRUCTION SYSTEMS FOR BUILDINGS WITH GREEN WALLS

FIELD OF THE INVENTION

The present invention relates to an ecological construction system for buildings with green walls, directly applicable in construction industry. More specifically it relates to a set of polygonal modules integrating simultaneously in the same module a wall structure as the main support structure and a structure for growing plants for construction of green walls, vertical gardens and green facades.

BACKGROUND OF THE INVENTION

Today, materials that have to do with ecotechnologies are benchmarks in any kind of construction. In this case and in particular, green gardens are breaking through green constructions as an ecological trend with great success and acceptance in architecture in addition to the great benefits that they bring in favor of the environment. In the so-called green walls plants are fixed and grown.

Typically green walls and its retaining elements are dense and very thick. Various construction systems and methods have been developed currently to enable and construct green walls with some type of vertical landscape. Most conventional green walls are formed first from a traditional wall (also known as gray wall), almost always a support or metal frame is attached to them; then different types of metal panels, plastic panels, some kind of container, some type of bag and natural or synthetic substrates are placed and fixed to the metal structure so as to accommodate and grow some kind of vegetation, being these bulky and thus expensive.

For example, U.S. Pat. No. 4,961,284, entitled Vertical Garden, discloses a container for growing plants including a rigid self-support material that has an open top and a dosed bottom, a liner with a dosed bottom and an open top, which is placed inside the frame; Framing of openings on the front face of the frame, holes in the liner according to the frame openings; a vertically oriented tube in the growing medium, sealed at the bottom end and open at the top end. Means for hanging and fixing the frame are provided.

U.S. Pat. No. 6,725,601 discloses the use of a main structure that can be constructed using either solid steel assembly or reinforced concrete assembly, which acts as the support structure for the new construction or remodeling. The main structure whether it uses reinforced concrete or steel, is comprised of cells of equilateral size and each cell has a passage between inner and outer wall. The inner wall uses the passages to secure accompanying structures and systems to a wall that uses this structural system. The outer wall uses the holes for securing the retaining assembly to the structure. There is a stratum from the floor to the wall that creates plant pots along the outer wall face. The flowerpots are also to fix the retaining assembly with the vertical structure and vegetation. The passages between inner and outer walls are also used to feed the vegetation, allowing direct access to the plant in the structure; using the construction method of this invention each plant can receive the optimal amount of irrigation, drainage and fertilizers.

U.S. Pat. No. 7,627,983 B1 discloses a modular system for housing walls with plant growing comprising a plurality of plant pots configured so that they can be attached at their edges to form a vertical wall. These curve-shaped plant pots with front surface define a container for the plants, which can be manufactured in porous surfaces to allow water supply and filtration. Another embodiment consists of stacked bio-blocks having cavities for soil and water, which are fixed to a matrix surface, with openings for the plants growing in the soil media.

Patent application WO 2011/148011 discloses a green wall system for facades, which comprises placing and fixing a metal frame to which is attached a plastic panel that serves a support for the geogrids and these serve as a support for the plants. At the top of the geogrids are drip-irrigation nozzles fed via a water-recirculation passage, since the excess water is collected in a channel, and then is filtered, analyzed and supplemented with fertilizers and acids, all of which is controlled by a computer, being possible to drain the recirculation circuit and add fresh treated water.

Spain patent application 200901772 with publication number 2 376 932 discloses a three-dimensional structure system for a sustainable vegetation cover, which is part of hydroponics and soil-less cultivation applied to modern gardening in sustainable buildings. The modular growing units allow overlapping and independence of the remainder, includes anchorage of units, fertigation and collection of drainage, which are installed in three-dimensional architectural surfaces. The holes for vegetation are designed in such way that they avoid the side fall of the substrate and the removal of plants individually by the observer. Culture units are watered by self-compensating, anti-drain drippers, one for each modular cultivation unit and hidden from view.

U.S. Pat. No. 5,729,944 discloses a building erected with thermoplastic structural components extruded, these components include hollow panels, hollow connectors, beams, and hollow adapters. For assembling the system, the extruded components are interlocked to each other continuously by their edges to form vertical walls and the roof of the building. Each structural component is hollow, made of PVC plastic material, with spaced inner and outer was that are connected by means of transverse interlocks, forming internal cells, appears basically as a panel in which concrete is poured to form inner and outer wall faces with smooth and plastic finish.

A drawback of Vittorio De Zen's system is that his plastic component system was designed for buildings with a surface finish that is always smooth and plastic, the assembly thereof is made by means of a hollow thermoplastic panel with male-like coupling means at their ends; for assembling the system it is always required a connector between panels, and without these connectors is not possible to do this.

Patent application PCT/MX2005/000012 with international publication number WO 2005/098158 A1 discloses a panel structure with coupling means for prefabricating buildings, the panel structure is rectangular and longitudinal with internal individual cavities not interconnected, easy to assembly and to couple each other, as well as complementary structural elements such as steel columns inserted and coupled only in the cavities formed between the assemblies of the panel structure against the panel structure, so that concrete or any other material is poured into the inner cavities, thus forming a wall structure with plastic surface and finishing for building.

A major drawback of this panel structure system with coupling means for prefabricated buildings is that in the wall structure assembly there is no internal communication between elements, thus reducing the structural capabilities of the system; when concrete or other material is poured a monolithic continuous final structure is not obtained; to achieve structural stability the system uses steel columns with non-commercial structural profiles, this greatly increases manufacturing and project costs, and in addition the system was designed to always obtain a smooth and plastic final surface in its walls.

U.S. Pat. No. 7,628,570 B2 discloses a modular retaining wall, wherein the wall is at least partially below a surface, and the surface can be land-based or aqueous-based, the walls consist of open or closed polygonal modules with channels disposed therein, as well as other components such as hollow profiles, flat profiles, module connectors, hollow corner-connecting profiles and hollow adapters. The wall modules are fastened together by respective coupling and fastening closures so that the connectivity is always provided between modules; however it retains the ability for the liquid to pass through, being always smooth and plastic the finish surface.

A drawback of the John Davidsaver and Acott Yeany's modular system is that to form intermediate and divider wall configurations elements like nuts and bolts are required, this increases the building time and the apparent low costs of these elements, which in larger scale are reflected in increased building times and project costs, and also that the system was designed for a smooth and plastic surface finishing.

Based on the above, there is a need in the market for a new green wall system more versatile, more manageable and in less scale, a new comprehensive green wall system wherein the wall, the cavity and the container for housing and cultivating the plant are integrated in the same module, as well as elements to secure them, also being this system the main support structure, thus eliminating the use of any kind of structure or metal support frame, also eliminating the support and retaining means such as panels, containers and growing units, as well as their mounting elements such as screws, nails and self-drilling screws; greatly reducing the times and costs of building. The present invention aims to provide a solution for this need detected, and it would be of great relevance in the field of prefabricated materials for the construction industry.

OBJECT OF THE INVENTION

The general object of the present invention is to provide an ecological construction system for buildings with green walls that integrates into a single polygonal module the main supporting wall structure and the growing plant system, eliminating the use of all kinds of racks or secondary supporting metal structures, as well as all kinds of panels, modules or containers and their fasteners such as screws, nails, self-drilling screws, bolts or wedges.

Another object of the present invention is to provide an ecological construction system for buildings with green walls to prepare part or the entire surface of the facade, as well as enable existing gray walls for growing vegetation.

Another object of the present invention is to provide an ecological construction system for buildings with green walls, comprising a set of polygonal modules, assembled to form the wall structure with concrete and steel reinforced formwork as a monolithic supporting structure, these same modules are characterized by special adaptations to include simultaneously plant and vegetation growing for constructing green walls, vertical gardens and green facades.

Another object of the present invention is to provide an ecological construction system for buildings with green walls with a cultivation and irrigation system for plants and vegetation contemplating the formation of corners, flat walls, dividing walls and wall intersections, which can be indoors or outdoors.

Another object of the present invention is to make available an ecological construction system for buildings with green walls with plant culture and irrigation with a set of polygonal modules characterized by comprising cavities for housing and fixing the containers for growing plants, housing natural or artificial substrates (soil and synthetic fibers), housing the drip irrigation system, host the water collection channel and housing cavities for concrete and steel reinforced formwork in the same polygonal module.

Another object of the invention is to make available an ecological construction system for buildings with green walls that also enables the housing and fixing of containers in the modules in a hidden way without the need for screws, self-drilling screws, wedges or welding.

Another object of the invention is to make available an ecological construction system for buildings with green walls with a set of polygonal modules, which involve large-scale production through a thermoplastic extrusion process and the manufacture of plastic containers by means of a thermoplastic injection process.

DESCRIPTION OF THE INVENTION

The present invention, as described in the field of invention, relates to an ecological construction system for buildings with green walls, a new type of prefabricated material, which consists of a set of polygonal modules with concrete and steel reinforced formwork, where plants and vegetation grow simultaneously in the same module, which can be constructed easily and quickly.

The new prefabricated material with the state of the art development to date, consists of a construction system for buildings with green walls comprised by a set of polygonal modules which are manufactured by an industrialized process by means of a thermoplastic extrusion process of high-strength vinyl polymers (PVC), of novel concept and functionality, which essentially are characterized by their polygonal geometry defined, reinforcing ribs with punched sections, assembly means, front and rear surface with punched sections and cavities arranged to accommodate the plant growing and watering system, simultaneously with concrete and steel reinforced formwork. The use of plastic container elements is contemplated, which are manufactured by means of a thermoplastic injection process for growing plants vertically or horizontally; they comprise connection and interlocking means to be set against the punched sections of the front or rear surface in the polygonal modules without the need for any screw, self-drilling screw, bolt, wedge or welding.

More specifically, the system of the present invention is based on the continuous assembly of polygonal modules, forming a wall structure; in a section of the structure the concrete and steel reinforced formwork is made, which is the main monolithic supporting structure; simultaneously in the remaining section of the wall structure and in its rear or front surface they provide a means for supporting and housing a plastic container in which the plants or vegetation are placed, which is positioned and secured in the punched section on the front surface of the module. In the hollow cavities of the wall structure the ducts of the drip irrigation system that will supply the water and nutrients will be accommodated; it is also contemplated that this cavities can be filled partially or completely with some type of natural or artificial substrate (soil, fibers or mineral wools); in the lower part of the wall structure a channel is provided to collect and remove the excess irrigation water.

DETAILED DESCRIPTION OF A PREFERRED EMBODIMENT

The characteristic details of the ecological construction system for buildings with green walls are shown in the following detailed description and the accompanying illustrative drawings, serving the same reference signs to indicate the same parts, for the purpose of helping to understand the features of the invention, where with illustrative and not limiting character the following is represented:

Referring to FIGS. 1, 2A, 2B, and 2C, they show the elements of the ecological construction system for buildings with green walls, which comprises a set of polygonal modules with defined geometry to create flat green walls, green corners, green dividing walls and green wall intersections which can be for indoor and outdoor; these polygonal modules are characterized by comprising a front wall 11 and a rear wall 12 of which at least one of these has arrangements of punched sections 13, middle wall 14, width 15 with punched sections 16, length 17, reinforcing ribs 18 with punched sections 16, forming separated hollow cavities 19 interacting with each other, also having at the ends of the module tongue and groove type assembly means; so that the groove 33 of the female track and the projection of the male rail 34 are always fitted exactly against each other, allowing a successive assembly of the system components.

Figure 1:
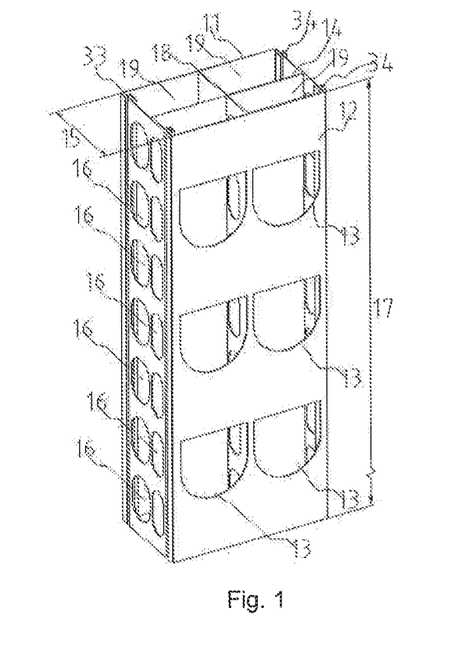
FIG. 1 shows schematically the perspective view of one type of embodiment of a polygonal module to generate flat green walls from the ecological construction system with plants and vegetation growing.
Figure 2A:
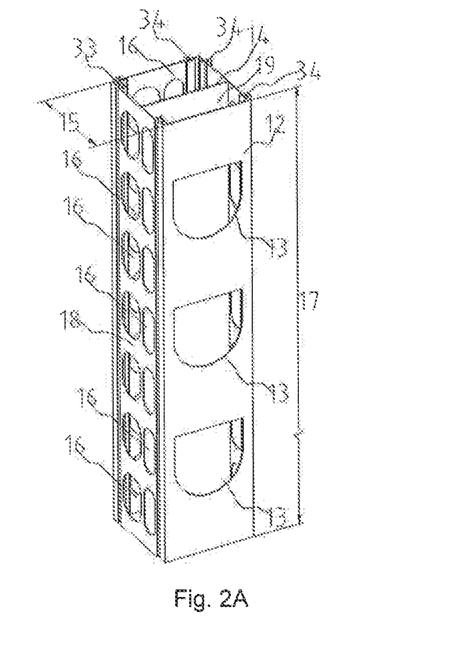
FIGS. 2A, 2B, and 2C are perspective views of one type of embodiment of polygonal modules to generate dividing walls, wall intersections and corners for green walls.
Figure 2B:
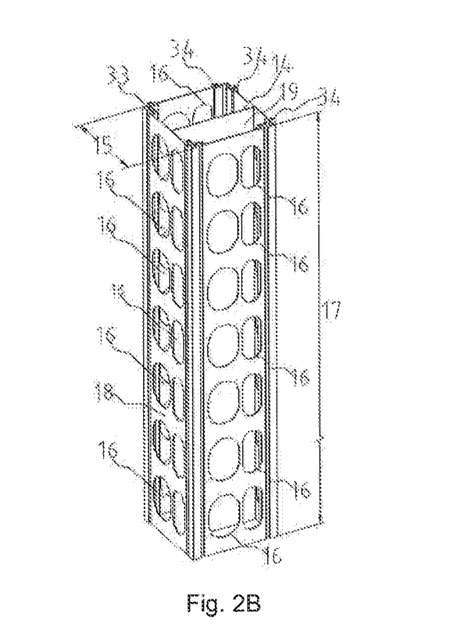
Figure 2C:
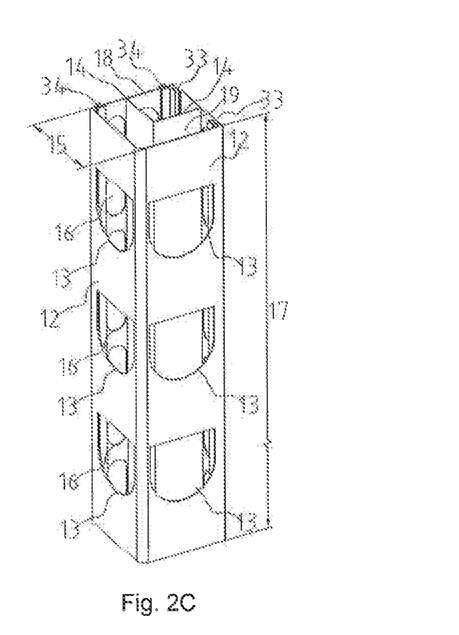
Figure 3:
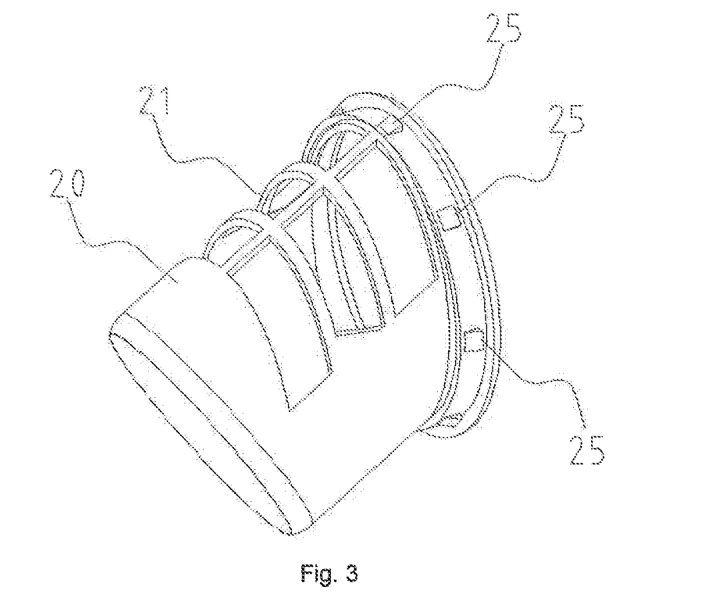
FIG. 3 is a perspective view of one type of embodiment of a plastic container for plant and vegetation growing in horizontal way.
Figure 4:
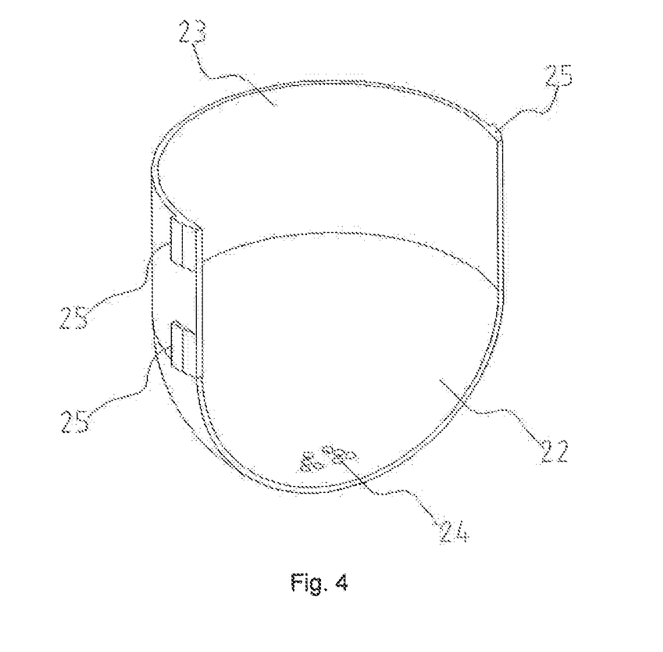
FIG. 4 is a perspective view of one type of embodiment of a plastic container for plant and vegetation growing in vertical way.
Figure 5:
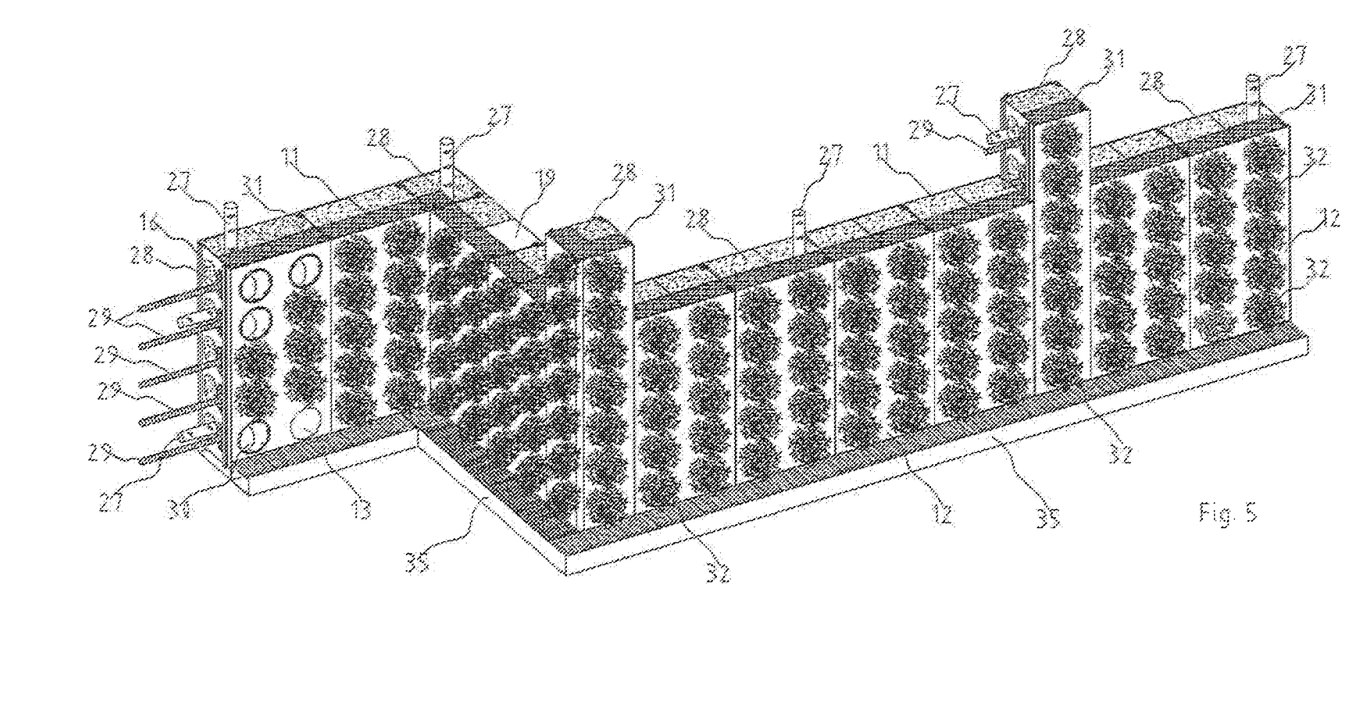
FIG. 5 schematically shows the perspective view of one type of embodiment of a portion of the assembly section of the integral wall structure with a part with concrete and steel reinforced formwork; simultaneously in the same wall structure, in the remaining part, are shown the ducts of drip irrigation system, plastic containers, natural or artificial substrates, the horizontal plant growing and the irrigation water collection channel of the present invention.
Figure 6:
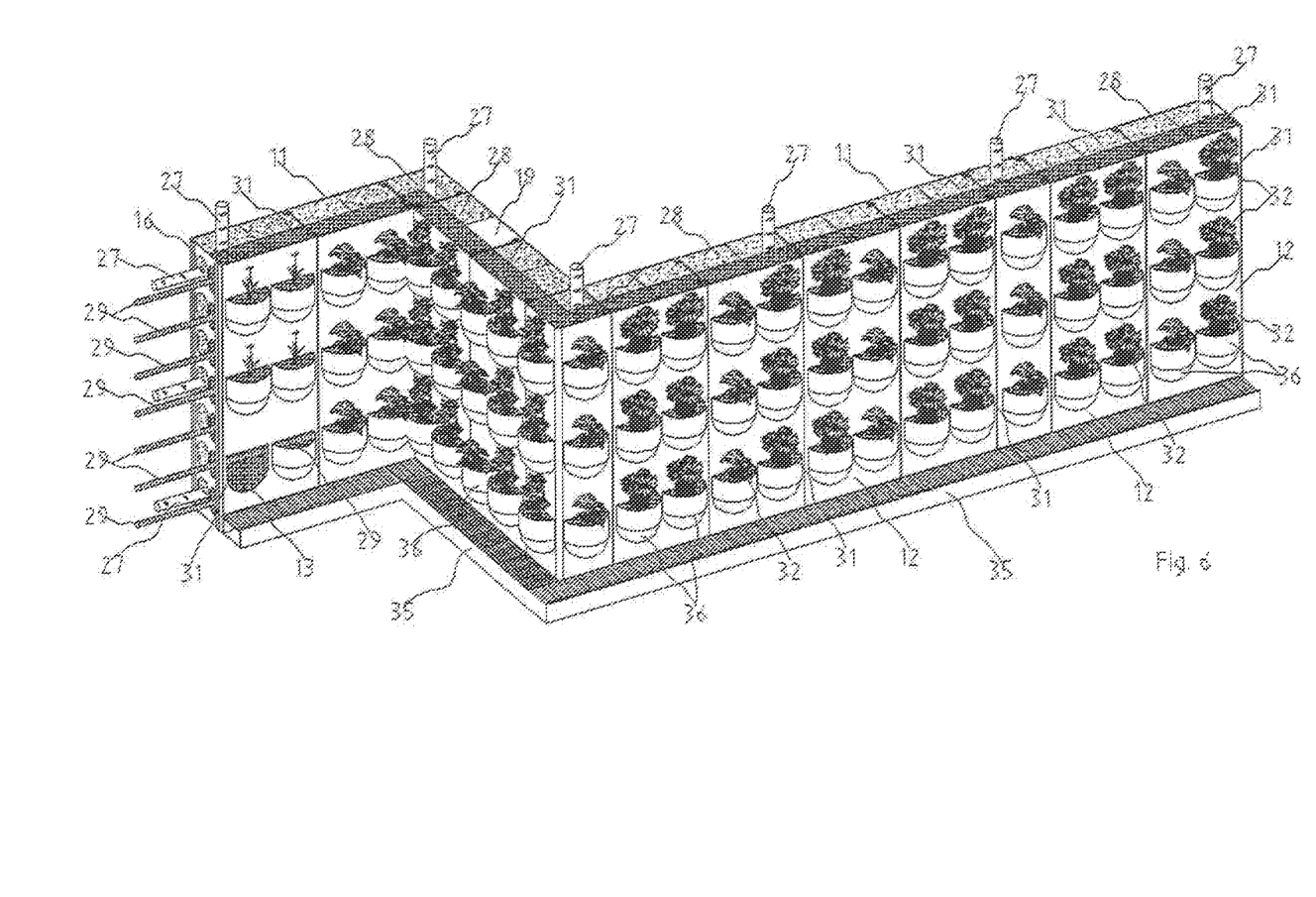
FIG. 6 is a perspective view of one type of embodiment of a portion of the assembly section of the integral wall structure with a part with concrete and steel reinforced formwork; simultaneously in the same wall structure, in the remaining part, are shown the ducts of drip irrigation system, plastic containers, natural or artificial substrates, the vertical plant growing and the irrigation water collection channel of the present invention.
Figure 7:
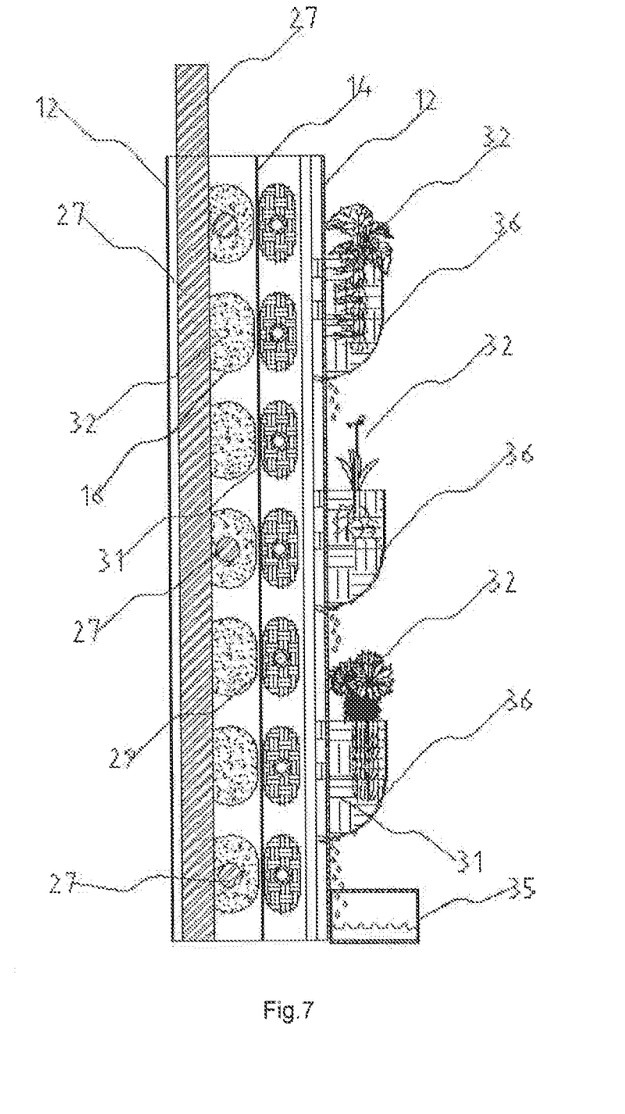
FIG. 7 schematically shows a side cut view of one type of embodiment of a portion of the assembly section of the integral wall structure with a part with concrete and steel reinforced formwork; simultaneously in the other section of the same wall structure the ducts of drip irrigation system, plastic containers, natural or artificial substrates, the vertical plant growing and the irrigation water collection channel of the present invention are shown.

Referring to FIGS. 3 and 4, they show the plastic containers for growing plants and vegetation which are fixed and snap fitted by connection means 25 against the punched section 13 of the surface of the front wall 11 or the rear wall 12 of the polygonal modules, containers can be for growing vegetation horizontally, which are characterized by their bucket-type hollow cylindrical shape 20 allowing to hold natural or artificial substrates and the root of the plant, with openings 21 in their surface allowing water irrigation; the container for growing vegetation vertically is characterized by a plant pot-type container with curved shape 22, front surface 23, holes 24 in the bottom, with the purpose of removing water excess, which will fall drop wise into the containers arrangement immediately below.

Referring to FIGS. 5, 6, 7, 8, 9, and 10, the construction system of the invention, intended for constructing of all types of buildings with green walls shows a portion of section comprising an integral wall structure having a part of its section with steel reinforced formwork 27 and concrete 28 which is the main monolithic supporting structure of the building; simultaneously on the same wall structure in their remaining part of the section in its hollow cavities 19 and in the arrangement of punched sections 13 of its front wall 11 or rear wall 12, the ducts of the drip irrigation system 29 are integrated and distributed in turn also on the same surface of the front wall 11 or rear wall 12, in their arrangements of punched sections 13 are housed and fixed the plastic containers 30, which constitute a support means for the substrate 31 (which may be natural or artificial), the root and plant cultivation 32, already grown before fixing the container in the front wall 11 or the rear wall 12 of the green wall structure, at the lower part of the structure is provided a channel 35 for collecting and filtering the water from the irrigation and this is brought into a container to reintegrate it to the irrigation system.

Also it is contemplated the use of plastic containers 36 for vertical cultivation, which are fixed against the front wall 11 surface or rear wall 12 surface of the integral wall structure to subsequently deposit the wild type substrate (soil) 31 in the containers and into the hollow cavities 19 for later cultivate the plant 32.

Figure 8:
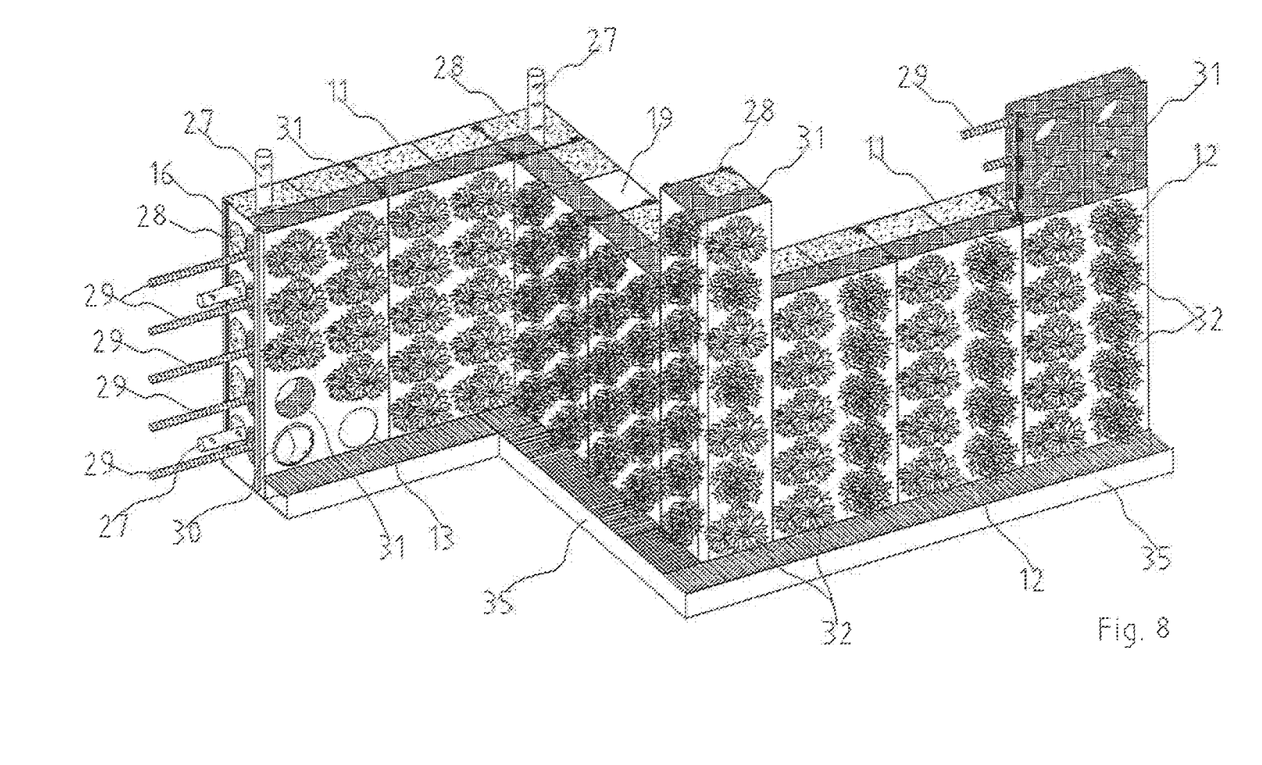
FIG. 8 is a perspective view of one type of embodiment of a portion of the assembly section of the integral wall structure with a part with concrete and steel reinforced formwork; simultaneously on the other section of the same wall structure are shown the ducts of drip irrigation system, artificial substrates (fibers of mineral wools) filling in cavities, plastic containers with horizontal plant growing and the collection water channel.

It is also intended to use artificial substrates 31 (fibers or mineral wools) to fill the hollow cavities 19, as well as plastic containers 30 of the green wall construction system of the present invention.

Figure 9:
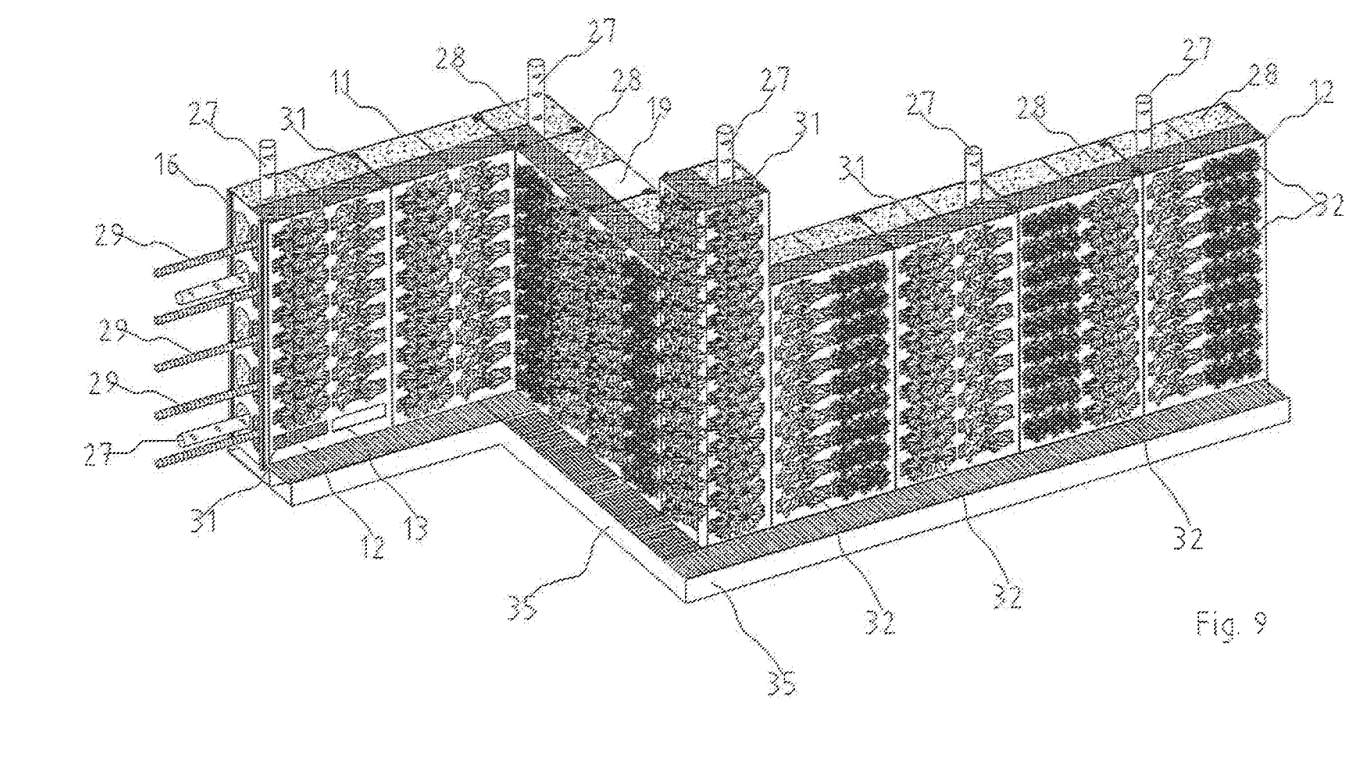
FIG. 9 schematically shows the perspective view of one type of embodiment of a portion of the assembly section of the integral wall structure with a part of the section with concrete and steel reinforced formwork; simultaneously in the same wall structure, in the remaining section is contemplated the housing of the ducts of drip irrigation system, natural or artificial substrates, the horizontal plant growing and an irrigation water collection channel.
Figure 10:
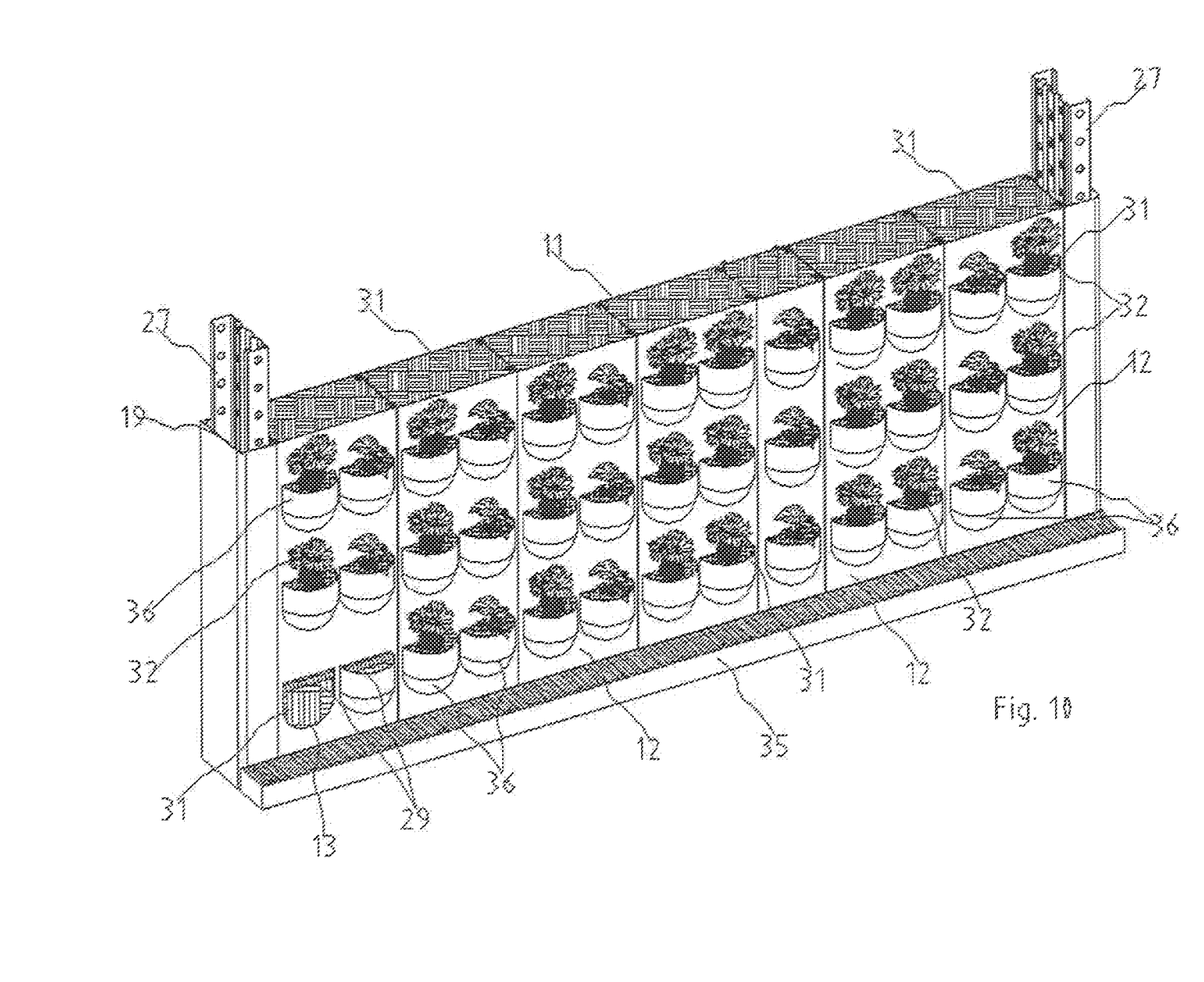
FIG. 10 shows schematically the perspective view of a portion of green wall section of one type of embodiment of the present invention which includes a wall structure with polygonal modules assembly, structural reinforcement elements of steel, drip irrigation ducts, natural substrates, plastic containers for growing plants vertically and a lower channel for collecting the excess water.

The system also contemplates not to use any type of plastic container 30, 33; the hollow cavities 19 of the integral wall structure are directly filled with the substrates 31 (natural or synthetic), and at the same time are placed the drip irrigation system ducts 29 and in the arrangements of punched sections 13 of that front wall 11 or rear wall 12 the plant growing 32 is performed.

The system thus constituted allows the growth of plants and vegetation in green walls for the construction of all types of buildings using a set of polygonal modules integrating the main supporting structure of the building and the structure for growing plants in a single wall structure, reducing and eliminating elements such as the use of metal support structures, retaining panels and elements to fix them, and a considerable reduction in time and cost of construction.

The present invention has been described in detail with reference to specific embodiments thereof, including the best mode for carrying out the invention, the drawings are by way of example and not limitation of the system, which is considered as a novelty, and therefore is claimed as property what is contained in the following claims.

The invention claimed is:

1. An ecological construction system for a building with at least one green wall, comprising:
   a set of polygonal modules, with each module being a longitudinally elongated monolithic extruded piece with an interior cavity and connection means for connection with an adjacent module, each module having front and rear sections, and left and right side sections, with at least some of said side sections having passageway apertures and at least one of said front and rear sections having plant growth apertures, and each of said modules having a demarcation interior wall, differentiating within the interior cavity of respective modules, a concrete pour reception region and a second region; and
   concrete and reinforcement formwork extending within the concrete pour reception regions of said modules, and said concrete and reinforcement formwork also extending through corresponding passageway apertures positioned at connected side surface interfaces of adjacent modules connected by said connection means,
   which concrete, reinforcement formwork and connected modules together define a main supporting monolithic wall of the building; and
   the second region of the modules including a portion into which the plant growth apertures open into.

2. The system of claim 1 wherein the longitudinal length of the modules is from floor to corresponding ceiling height of the building.

3. The system of claim 1 wherein the portion of the second region into which the plant growth apertures open into includes a drainable substrate material.

4. The system of claim 3 wherein the drainable substrate material is selected from the group consisting of soil, fibers, and minerals.

5. The system of claim 3 further comprising irrigation piping passing within the drainable substrate material.

6. The system of claim 1 further comprising irrigation piping extending within the second region of said modules.

7. The system of claim 1 wherein each module is formed entirely of a thermoplastic extruded material.

8. The system of claim 1 further comprising plant containers that extend through the plant growth apertures and into the second region of the interior cavity of the modules.

9. The system of claim 8 wherein the plant containers and portions of the module defining the plant growth apertures are in a snap fit connection relationship.

10. The system of claim 9 wherein the plant containers include a bottom enclosure cup section having drainage holes formed therein.

11. The system of claim 1 further comprising irrigation piping, and wherein the side section passageway apertures comprise a pair of longitudinally extending passageway aperture rows on a common side section, which rows are positioned internally between a pair of male or female connectors of the connection means also provided on a common side section of said modules, with a first of said aperture rows having building wall concrete passing there through and a second of said rows having the irrigation piping extending there through.

12. The system of claim 1 wherein the demarcation interior wall provided in the interior cavity of the modules is a solid extruded wall free of apertures so as to retain concrete in the concrete pour reception region.

13. The system of claim 12 further comprising a rib wall that extends from one of said front and rear walls and into contact with said demarcation interior wall, and which rib wall features a plurality of rib wall apertures suited for poured concrete passage there through.

14. An ecological construction apparatus for a green wall of a building, comprising:
   a longitudinally extending elongated single piece module having an interior cavity, said module including a front wall section, a rear wall section and first and second side wall sections, said module further comprising at least one interior demarcation wall extending within said interior cavity as to define a concrete pour reception region and a second interior region, at least one of said front and rear wall sections of said module comprising plant growth apertures which open into a substrate reception region contained within the second interior region of said module,
   said first and second side wall sections each having side wall passageway apertures with a first set opening into said concrete pour reception region and being dimensioned for passage of concrete, and said first and second side wall sections further including a connection device which includes longitudinally extending male locking projections and female locking recesses.

15. The apparatus of claim 14 further comprising a rib wall extending from one of said front and rear wall sections and into contact with the interior demarcation wall, and wherein said rib wall comprises concrete flow apertures along its longitudinal length.

16. The apparatus of claim 15 further comprising a second rib wall extending from the interior demarcation wall to the other of said front and rear wall sections, said second rib wall further comprising longitudinally separated openings.

17. The apparatus of claim 14 further comprising substrate drainage material contained in the portion of the second region into which the plant growth apertures open into, and irrigation piping passing within the substrate drainage material.

18. The apparatus of claim 14 wherein said module is formed entirely of a thermoplastic extruded material.

19. The apparatus of claim 14 further comprising plant containers that extend through the plant growth apertures and into the second region of the interior cavity of said module.

20. A process of assembling an ecological construction system used in the formation of a building green wall, comprising:
   connecting together a plurality of the modules of claim 14 such that passageway apertures, that open into respective concrete pour reception regions of adjacent modules, are in concrete flow alignment;
   positioning bars in a formwork that includes vertical bars extending longitudinally within at least some of said longitudinally elongated modules and crossing bars extending through passageway apertures that open into concrete pour reception regions of adjacent, connected modules;

pouring concrete within the concrete pour reception regions of the connected modules so as to form a concrete wall with integrated formwork;

providing substrate material and an irrigation system within the substrate reception regions of a plurality of said modules.

21. The process as defined in claim 20 further comprising inserting a plurality of plant holders into the plant growth apertures formed in said connected modules.

22. The system of claim 1 wherein the connection means includes full extruded piece length groove and projection rail combinations formed in the extruded module pieces.

* * * * *